US010445620B2

(12) United States Patent
Chen

(10) Patent No.: US 10,445,620 B2
(45) Date of Patent: Oct. 15, 2019

(54) METHOD AND SYSTEM FOR OBJECT TRACKING IN MULTIPLE NON-LINEAR DISTORTION LENSES

(71) Applicant: Institute For Information Industry, Taipei (TW)

(72) Inventor: Yu-Hao Chen, Taipei (TW)

(73) Assignee: Institute For Information Industry, Taipei (TW)

( * ) Notice: Subject to any disclaimer, the term of this patent is extended or adjusted under 35 U.S.C. 154(b) by 216 days.

(21) Appl. No.: 15/796,536

(22) Filed: Oct. 27, 2017

(65) Prior Publication Data

US 2019/0095754 A1 Mar. 28, 2019

(30) Foreign Application Priority Data

Sep. 22, 2017 (TW) .............................. 106132678 A

(51) Int. Cl.
*G06K 9/00* (2006.01)
*G06K 9/62* (2006.01)
*G06T 7/292* (2017.01)
*G06T 7/73* (2017.01)
*G06K 9/66* (2006.01)
*G06T 7/246* (2017.01)

(52) U.S. Cl.
CPC .............. *G06K 9/6242* (2013.01); *G06K 9/66* (2013.01); *G06T 7/251* (2017.01); *G06T 7/292* (2017.01); *G06T 7/75* (2017.01); *G06T 2207/30196* (2013.01); *G06T 2207/30232* (2013.01)

(58) Field of Classification Search
None
See application file for complete search history.

(56) References Cited

U.S. PATENT DOCUMENTS

| 6,763,148 | B1 | 7/2004 | Sternberg et al. |
| 9,959,651 | B2 * | 5/2018 | Sevin ................. G06K 9/00771 |
| 2015/0371403 | A1 * | 12/2015 | Koyama ................. G06T 7/292 |
| | | | 382/103 |

(Continued)

FOREIGN PATENT DOCUMENTS

CN 106874883 A 6/2017

OTHER PUBLICATIONS

Office Action to the corresponding Taiwan Patent Application rendered by the Taiwan Intellectual Property Office (TIPO) dated Aug. 31, 2018, 8 pages (including English translation).

*Primary Examiner* — Soo Jin Park
(74) *Attorney, Agent, or Firm* — Skaar Ulbrich Macari, P.A.

(57) ABSTRACT

An object tracking method and system in multiple non-linear distortion lenses are provided. A deep learning method is used for training an object identification model, an object comparison model, and a coordinate mapping model. The object identification model and the object comparison model are used for identifying and comparing objects with non-linear distortion respectively in order to find a plurality of groups of corresponding object information for the same objects in visions of multiple image capturing apparatuses. The coordinate mapping model is used for verifying the plurality of groups of corresponding object information, and finding all position mappings in visions of multiple image capturing apparatuses via the verified plurality of groups of corresponding object information.

20 Claims, 7 Drawing Sheets

(56) References Cited

U.S. PATENT DOCUMENTS

2016/0379079 A1* 12/2016 Han ................... G06K 9/00255
                                                              382/190
2017/0161591 A1    6/2017 English et al.

* cited by examiner

METHOD AND SYSTEM FOR OBJECT TRACKING IN MULTIPLE NON-LINEAR DISTORTION LENSES

PRIORITY

This application claims priority to Taiwan Patent Application No. 106132678 filed on Sep. 22, 2017, which is hereby incorporated by reference in its entirety.

FIELD

The present invention relates to a method and a system for object tracking in multiple non-linear distortion lenses, and more particularly, relates to a method and a system for object tracking in multiple non-linear distortion lenses by using an object identification model, an object comparison model and a coordinate mapping model that are trained through a deep learning method.

BACKGROUND

Owing to rapid development of the monitoring industry in recent years, monitoring video cameras can be found almost everywhere in public places. As the number of monitoring video cameras increases, the demands for tracking across different video cameras also increase. When a tracked object disappears from a monitoring range of an original video camera, a further determination needs to be made to detect whether the tracked object has left the public place where the original video camera is deployed or appears in a monitoring range of a different video camera. For example, if a consumer in a store disappears from a monitoring range of a first video camera, a further determination needs to be made to detect whether this consumer has moved into a monitoring range of a second video camera or has left the store.

For the problem described above, a common solution is to detect all figures in a monitoring frame according to a figure detection method, and then retrieve features from figure images for comparison. However, this consumes a lot of computing resources, and is disadvantageous in that it is difficult to distinguish between figures having similar features. Accordingly, a monitoring range map showing overlapped regions among video cameras may be created by comparing stationary objects in the video cameras and with the assistance of position information. For example, if deployment positions of other video cameras having monitoring ranges overlapped with first video camera are known, then positions where the consumer possibly shows up can be predicted to significantly reduce the comparison range. The most common and effective way to compare stationary objects is to find the so-called feature points in the graphics, and if a common feature point can be found through comparison in monitoring ranges of two video cameras, image mapping can be created between images captured by the two video cameras to create position mapping.

However, the aforesaid conventional way to find feature points assumes that there is no or only little non-linear distortion in the images captured by the video cameras. Therefore, when this conventional way is applied to non-linear distortion lenses such as wide-angle lenses or fisheye lenses, misjudgement of common feature points within monitoring ranges of a plurality of video cameras often takes place or positions of the common feature points cannot be mapped correctly to make it impossible to accurately track the object. Therefore, there is difficulty in practical implementation of this conventional method.

In terms of feature point searching in case of non-linear distortion in conventional graphics, early researches mainly assume that the non-linear distortion can be eliminated by a perfect projection formula. However, as has been proved later, it is difficult to generate a perfect projection formula unless manual or semi-automatic distortion measurement is made by use of a black-and-white checkerboard image.

In recent years, practices that reduce the measurement demands as far as possible and search for feature points on a distorted image directly have also been proposed, but most of them have limitations. For example, some of them assume that the non-linear distortion follows an invariable model. However, because there are various models of wide-angle lenses and fisheye lenses, the aforesaid assumption is still not a perfect common solution. Position matching for wide-angle lenses and fisheye lenses still remains as a difficult problem at present because it is difficult to stably find feature points. The non-linear distortion applied by these kinds of lenses leads to distortion of the conventional feature points per se and feature descriptors that describe surrounding relationships of the feature points, and this may cause failure of the matching. And when two video cameras have a large distance therebetween, adverse influences will come from not only the non-linear distortion of the video cameras per se but also from different viewing angles (e.g., a front view and a back view of the object).

The objective of the present invention is to solve the problem of position mapping in multiple non-linear distortion lenses in a fully automatic manner and particularly in cases of wide-angle and fisheye lenses.

SUMMARY

The present disclosure will discuss how to establish correct position information mapping between images captured by multiple video cameras according to a deep learning method when the images are captured by lenses that cause non-linear distortion (e.g., wide-angle lenses, fisheye lenses, or endoscopes).

The practice proposed in the present disclosure is as follows: the deep learning method is used to train three deep learning networks, where the first deep learning network is to identify objects in non-linear distortion, the second deep learning network is to identify an object in a common vision of multiple image capturing apparatuses and use the object as a feature object so as to determine whether instances of the object in the multiple image capturing apparatuses correspond to each other, and the third deep learning network is to find all position correspondences in multiple video camera frames according to the corresponding positions.

The disclosure includes an object tracking method, which comprises the following steps: (a) providing an object identification model, an object comparison model and a coordinate mapping model; (b) inputting a first image captured by a first image capturing apparatus and a second image captured by a second image capturing apparatus into the object identification model to identify a plurality of pieces of first image object information in the first image and a plurality of pieces of second image object information in the second image respectively; (c) inputting the plurality of pieces of first image object information and the plurality of pieces of second image object information into the object comparison model to find a plurality of groups of corresponding object information through comparison; (d) dividing the plurality of groups of corresponding object information into at least one group of reference corresponding object information and a group of to-be-verified corresponding object information, wherein the group of to-be-verified corresponding object information comprises a piece of first to-be-verified image object information and a piece of second to-be-verified image object information, inputting the at least one group of reference corresponding object information and the first to-be-verified image object information into the coordinate mapping model to obtain a piece of first output object information, determining that the first output object information is consistent with the second to-be-verified image object information, and repeating the step (d) until all the plurality of groups of corresponding object information have been verified; (e) inputting a first new image captured by the first image capturing apparatus into the object identification model to identify at least one piece of first new image object information in the first new image; and (f) inputting the plurality of groups of corresponding object information and the at least one piece of first new image object information into the coordinate mapping model to obtain at least one piece of first output new object information in the second image capturing apparatus that corresponds to the at least one piece of first new image object information.

The disclosure also includes an object tracking system, which comprises a database and a processor electrically connected to each other. The database stores an object identification model, an object comparison model and a coordinate mapping model. The processor is configured to execute the following steps: (a) reading the database to obtain the object identification model, the object comparison model and the coordinate mapping model; and (b) inputting a first image captured by a first image capturing apparatus and a second image captured by a second image capturing apparatus into the object identification model to identify a plurality of pieces of first image object information in the first image and a plurality of pieces of second image object information in the second image respectively; (c) inputting the plurality of pieces of first image object information and the plurality of pieces of second image object information into the object comparison model to find a plurality of groups of corresponding object information through comparison; (d) dividing the plurality of groups of corresponding object information into at least one group of reference corresponding object information and a group of to-be-verified corresponding object information, wherein the group of to-be-verified corresponding object information comprises a piece of first to-be-verified image object information and a piece of second to-be-verified image object information, inputting the at least one group of reference corresponding object information and the first to-be-verified image object information into the coordinate mapping model to obtain a piece of first output object information, determining that the first output object information is consistent with the second to-be-verified image object information, and repeating the step (d) until all the plurality of groups of corresponding object information have been verified; (e) inputting a first new image captured by the first image capturing apparatus into the object identification model to identify at least one piece of first new image object information in the first new image; and (f) inputting the plurality of groups of corresponding object information and the at least one piece of first new image object information into the coordinate mapping model to obtain at least one piece of first output new object information in the second image capturing apparatus that corresponds to the at least one piece of first new image object information.

Other applications of the present invention will be readily devised by those of ordinary skill in the art from the following detailed description. However, it shall be understood that, the following detailed description and specific examples are provided only for purpose of illustration because various changes and modifications within the spirit and scope of the present invention will be appreciated by those of ordinary skill in the art from the detailed description.

BRIEF DESCRIPTION OF THE DRAWINGS

The present invention can be fully understood from the following detailed description and the attached drawings. However, the attached drawings are provided only for purpose of illustration but not to limit the present invention, and in the attached drawings.

DETAILED DESCRIPTION

In the following description, the present invention will be explained with reference to exemplary embodiments thereof. However, these exemplary embodiments are not intended to limit the present invention to any specific examples, embodiments, environment, applications or implementations described in these embodiments. Therefore, description of these exemplary embodiments is only for purpose of illustration rather than to limit the scope of the present invention, and the scope of this application shall be governed by the claims.

It shall be appreciated that, in the following embodiments and the attached drawings, elements unrelated to the present invention are omitted from depiction; and dimensional relationships among individual elements in the attached drawings are only illustrated for ease of understanding, but not to limit the scope of the present invention.

Figure 1A:
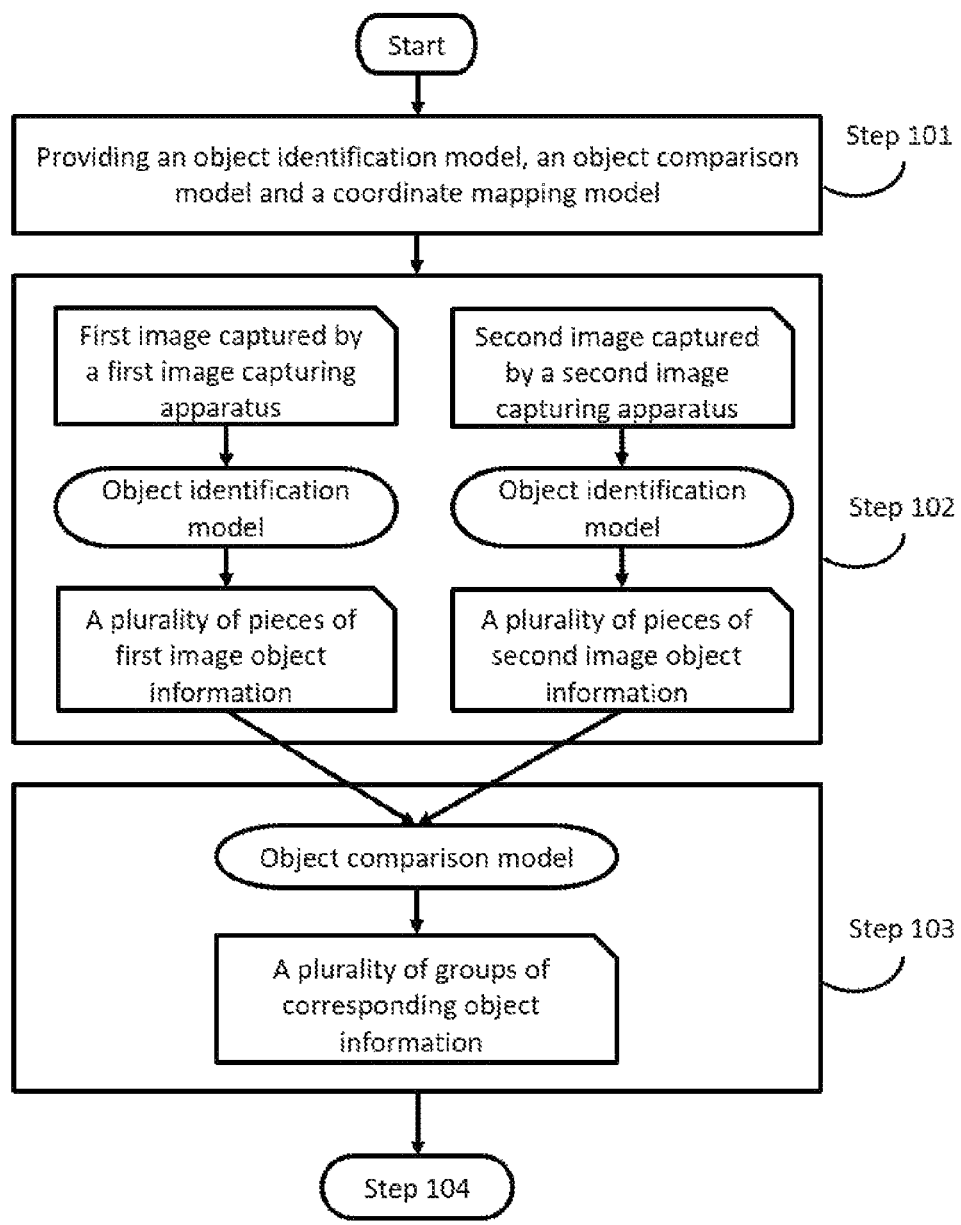
FIGS. 1A-1C are flowchart diagrams of an object tracking method in multiple non-linear distortion lenses according to a first embodiment of the present invention.
Figure 1B:
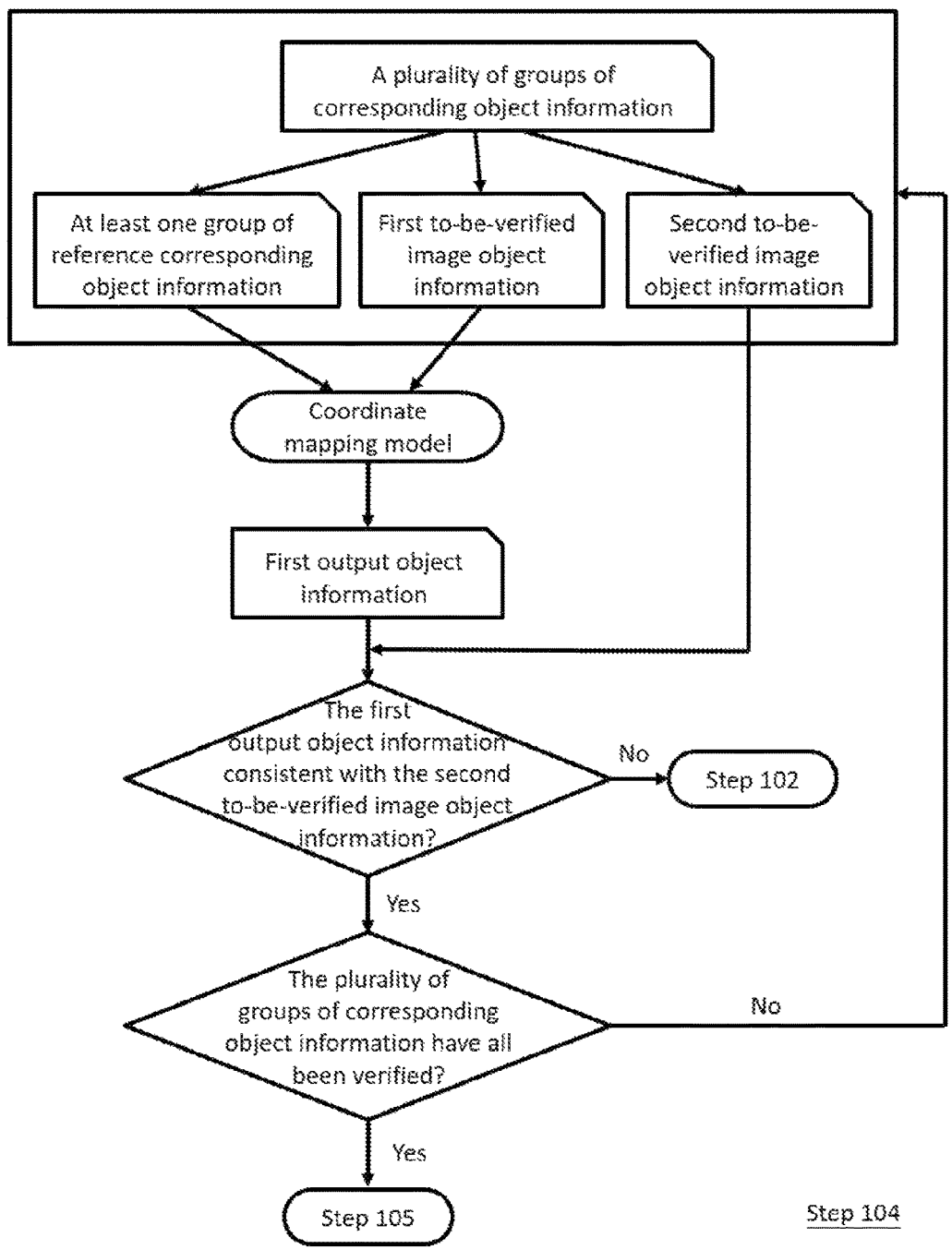
Figure 1C:
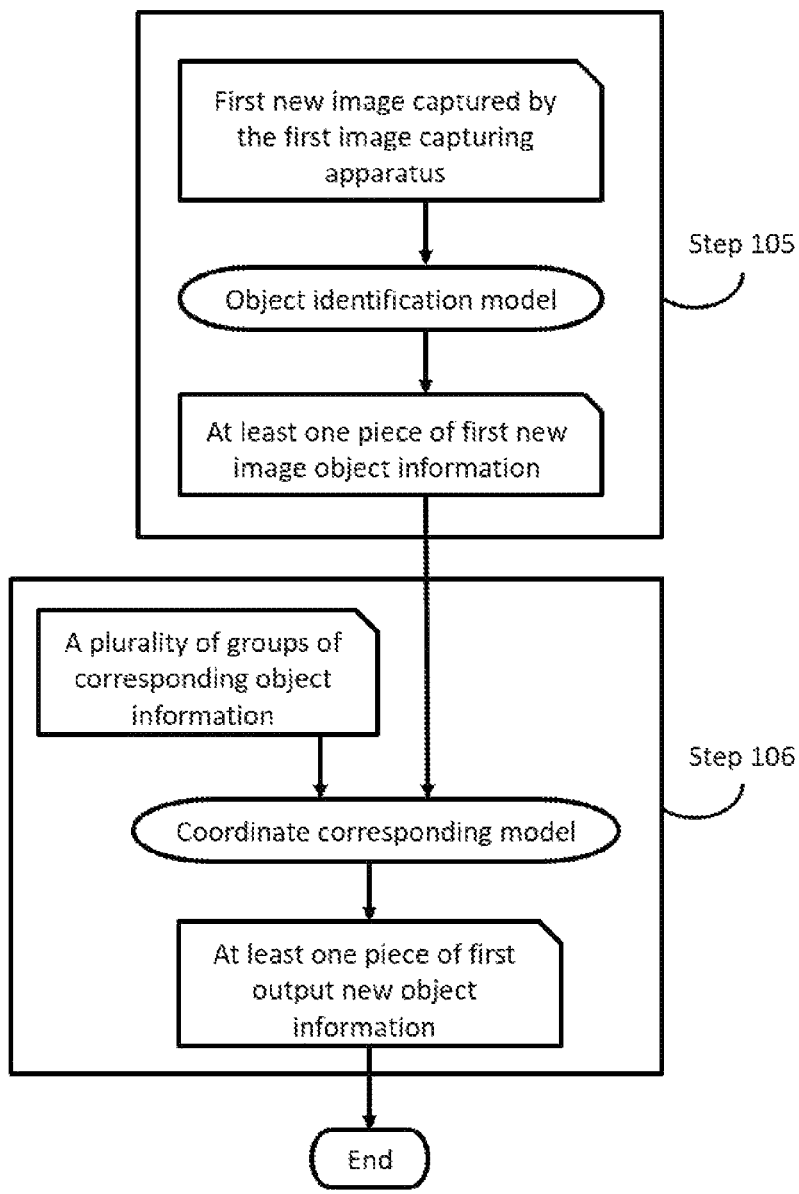

A first embodiment of the present invention is an object tracking method in multiple non-linear distortion lenses, flowchart diagrams of which are depicted in FIGS. 1A-1C. The object tracking method may be executed by a computer or some other device having an electronic computation capability. The object tracking method comprises steps 101 to 106, which will be detailed as follows.

Step 101: providing an object identification model, an object comparison model and a coordinate mapping model. In some embodiments, each of the object identification model, the object comparison model and the coordinate mapping model is trained by a deep learning method, and each of the deep learning methods may comprise an artificial neural network.

The present invention uses the deep learning method for object detection and comparison, provides sufficient training images for training the deep learning method, and then uses the trained deep learning network to detect various objects such as figures, pot cultures and vehicles and/or similar patterns. As compared with the conventional technology where an invariable model of non-linear distortion must be followed when feature points are searched in non-linearly distorted images, the deep learning network of the present invention can train images having various degrees of on-linear distortion instead of being limited to any specific model.

In some embodiments, related information of the object identification model, the object comparison model and the coordinate mapping model may be as shown in Table 1:

For example, the step 102 may label a range where an object is located in the image with a rectangular box, and use rectangular coordinates to indicate the position of the rectangular box. The rectangular coordinates comprise two coordinate points, which may be an upper left corner and a lower right corner of the rectangular box, or a lower left corner and an upper right corner of the rectangular box. The

| Model | Purpose | Input | Output |
|---|---|---|---|
| Object identification model | Identify objects in images captured by non-linear distortion lenses, and may indicate a range where an object is located (e.g., label the position range of the object with a rectangular box) | A complete or partial image that is non-linearly distorted (e.g., an image captured by a fisheye lens) | Object information of objects identified, e.g., object names, object categories, object positions (e.g., presented by rectangular coordinates) |
| Object comparison model | Compare objects in non-linearly distorted images with each other to determine whether they are a same object (e.g., a same cabinet, or desk/chairs within a same region) | Two complete or partial images that are non-linearly distorted. | Calculate a probability that objects in the two images are a same object, and when the objects in the two images are a same object (e.g., the probability being greater than a threshold), output object information of the same object, e.g., an object name, an object category and/or an object position (e.g., presented by rectangular coordinates) |
| Coordinate mapping model | To learn the distortion condition of non-linear lenses according to the identified feature points and the relative relationships, and to deduce mapping relationships between positions of objects in images captured by multiple non-linear distortion lenses. | (1) N-1 groups of corresponding object information (which may comprise rectangular coordinates), each group of rectangular coordinates representing positions of a same object (a feature object) in two images, N being a positive integer greater than 1, and (2) object information (which may comprise rectangular coordinates) of an object in an image of another group of corresponding objects. | Object information (which may comprise rectangular coordinates) of an object in another image of the another group of corresponding objects. |

Step 102: inputting a first image captured by a first image capturing apparatus and a second image captured by a second image capturing apparatus into the object identification model to identify a plurality of pieces of first image object information in the first image and a plurality of pieces of second image object information in the second image respectively. In some embodiments, the plurality of pieces of first image object information at least include a plurality of object names of a plurality of objects in the first image and a plurality of coordinates of the plurality of objects in the first image capturing apparatus, and the plurality of pieces of second image object information at least include a plurality of object names of a plurality of objects in the second image and a plurality of coordinates of the plurality of objects in the second image capturing apparatus. In some embodiments, the first image capturing apparatus and the second image capturing apparatus each comprise a non-linear distortion lens, e.g., a fisheye lens, a wide-angle lens and an endoscope.

plurality of coordinates described above are just the rectangular coordinates described herein.

Take fisheye lenses used in an office as an example. It is hereby assumed that a first image captured by the image capturing apparatus A is an office image. Through identification by the object identification model, a plurality of pieces of first image object information is obtained from the office image: [desk, $(2,2)_A$, $(3,3)_A$], [chair, $(1,4)_A$, $(1.5,4.5)_A$], [bookcase, $(4,2)_A$, $(5,4)_A$] and [wall, $(1,5)_A$, $(3,6)_A$], where the plurality of object names are desk, chair, bookcase and wall, and the rectangular coordinates of the objects in the first image are [$(2,2)_A$, $(3,3)_A$], [$(1,4)_A$, $(1.5,4.5)_A$], [$(4,2)_A$, $(5,4)_A$] and [$(1,5)_A$, $(3,6)_A$] (taking the lower left corner and the upper right corner of the rectangular box as examples of the coordinate points). These rectangular coordinates just represent coordinates of the aforesaid objects in the first image, i.e., coordinates in the vision of the image capturing apparatus A.

Step 103: inputting the plurality of pieces of first image object information and the plurality of pieces of second image object information into the object comparison model to find a plurality of groups of corresponding object information through comparison. In some embodiments, the plurality of groups of corresponding object information at least include a plurality of object names of a plurality of corresponding objects in the first image and the second image and a plurality of corresponding coordinates of the plurality of corresponding objects in the first image capturing apparatus and the second image capturing apparatus respectively.

Also in the aforesaid example, the plurality of pieces of first image object information of the first image captured by the image capturing apparatus A in the office are [desk, $(2,2)_A$, $(3,3)_A$], [chair, $(1,4)_A$, $(1.5,4.5)_A$], [bookcase, $(4,2)_A$, $(5,4)_A$] and [wall, $(1,5)_A$, $(3,6)_A$]. It is hereby assumed that a plurality of pieces of second image object information of the second image captured by the image capturing apparatus B are [chair, $(-4,4)_B$, $(-3.5,4.5)_B$], [bookcase, $(-1,2)_B$, $(0,4)_B$], [wall, $(-4,5)_B$, $(-2,6)_B$] and [pot culture, $(0,5)_B$, $(0.5,5.5)_B$]. The object comparison model may determine through comparison that objects appearing both in the first image and the second image are chair, bookcase and wall according to the plurality of pieces of first image object information and the plurality of pieces of second image object information, and obtain three groups of corresponding object information, i.e., [chair, $(1,4)_A$, $(1.5,4.5)_A$, $(-4,4)_B$, $(-3.5,4.5)_B$], [bookcase, $(4,2)_A$, $(5,4)_A$, $(-1,2)_B$, $(0,4)_B$], and [wall, $(1,5)_A$, $(3,6)_A$, $(-4,5)_B$, $(-2,6)_B$].

Step 104: dividing the plurality of groups of corresponding object information into at least one group of reference corresponding object information and a group of to-be-verified corresponding object information, where the group of to-be-verified corresponding object information comprises a piece of first to-be-verified image object information and a piece of second to-be-verified image object information. The step 104 also inputs the at least one group of reference corresponding object information and the first to-be-verified image object information into the coordinate mapping model to obtain a piece of first output object information, and determines through comparison whether the first output object information is consistent with the second to-be-verified image object information. If the first output object information is inconsistent with the second to-be-verified image object information, then the process returns back to the step 102. Otherwise, if the first output object information is consistent with the second to-be-verified image object information, it means that verification of this group of to-be-verified corresponding object information has been completed, and the step 104 is repeated to verify other groups of corresponding object information. If the comparison result of each of the plurality of groups of corresponding object information is "consistent", then it means that the plurality of groups of corresponding object information have all been verified, and then the process proceeds to step 105.

Also in the aforesaid example, it is assumed that N groups of corresponding object information are obtained in the aforesaid step 103, where N is a positive integer. Additionally, it is assumed that the first three groups represent corresponding object information of chair, bookcase and wall, e.g.,[chair, $(1,4)_A$, $(1.5,4.5)_A$, $(-4,4)_B$, $(-3.5,4.5)_B$], [bookcase, $(4,2)_A$, $(5,4)_A$, $(-1,2)_B$, $(0,4)_B$], and [wall, $(1,5)_A$, $(3,6)_A$, $(-4,5)_B$, $(-2,6)_B$]. The step 104 divides the N groups of corresponding object information into N-1 groups of reference corresponding object information and one group of to-be-verified corresponding object information. It is hereby assumed that the corresponding object information of chair (i.e., [chair, $(1,4)_A$, $(1.5,4.5)_A$, $(-4,4)_B$, $(-3.5,4.5)_B$]) is selected in the step 104 as the to-be-verified corresponding object information, which comprises first to-be-verified image object information (e.g., [chair, $(1,4)_A$, $(1.5,4.5)_A$]) and second to-be-verified image object information (e.g., [chair, $(-4,4)_B$, $(-3.5,4.5)_B$]), and the other N-1 groups serve as the reference corresponding object information. The step 104 inputs the N-1 groups of reference corresponding object information and the first to-be-verified image object information (e.g., [chair, $(1,4)_A$, $(1.5,4.5)_A$]) into the coordinate mapping model to obtain a piece of first output object information (e.g., [chair, $(x_1,y_1)_B$, $(x_2,y_2)_B$]). Then the step 104 determines whether the first output object information (e.g., [chair, $(x_1,y_1)_B$, $(x_2,y_2)_B$]) is consistent with the second to-be-verified image object information (e.g., [chair, $(-4,4)_B$, $(-3.5,4.5)_B$]). If the first output object information is inconsistent with the second to-be-verified image object information, then the process returns back to the step 102. Otherwise, if the first output object information is consistent with the second to-be-verified image object information, it means that verification of this group of to-be-verified corresponding object information that corresponds to chair (i.e., [chair, $(1,4)_A$, $(1.5,4.5)_A$, $(-4,4)_B$, $(-3.5,4.5)_B$]) has been completed, and the step 104 is repeated to verify a next group of corresponding object information (e.g., the corresponding object information of bookcase). The step 104 may be repeated until the comparison result of each of the plurality of groups of corresponding object information is "consistent". Then it means that the N groups of corresponding object information have all been verified (i.e., the N groups of corresponding object information can represent the coordinate mapping relationship between the first image capturing apparatus and the second image capturing apparatus), and then the process proceeds to the step 105.

Step 105: inputting a first new image captured by the first image capturing apparatus into the object identification model to identify at least one piece of first new image object information in the first new image.

Step 106: inputting the plurality of groups of corresponding object information and the at least one piece of first new image object information into the coordinate mapping model to obtain at least one piece of first output new object information in the second image capturing apparatus that corresponds to the at least one piece of first new image object information.

Also in the aforesaid example, the new image captured by the image capturing apparatus A in the office is inputted into the object identification model to identify at least one piece of first image object information. It is assumed that three pieces of first new image object information are identified, which are [desk, $(2,2)_A$, $(3,3)_A$], [chair, $(1,4)_A$, $(1.5,4.5)_A$] and [window, $(1,1)_A$, $(1.5,1.5)_A$] respectively. The step 106 inputs the aforesaid N groups of corresponding object information and the three pieces of first new image object information (i.e., [desk, $(2,2)_A$, $(3,3)_A$], [chair, $(1,4)_A$, $(1.5, 4.5)_A$] and [window, $(1,1)_A$, $(1.5,1.5)_A$]) into the coordinate mapping model to obtain three pieces of first output new object information (e.g., [desk, $(-3,2)_B$, $(-2,3)_B$], [chair, $(-4,4)_B$, $(-3.5,4.5)_B$] and [window, $(-4,1)_B$, $(-3.5,1.5)_B$]). Rectangular coordinates comprised in the three pieces of first output new object information just represent coordinates of the aforesaid objects in the vision of the image capturing apparatus B and are also object information of desk, chair and window in the image capturing apparatus B relative to the image capturing apparatus A.

As can be known from the above description of the first embodiment, the present invention uses the object identification model, the object comparison model and the coordinate mapping model that have been trained to find N groups of corresponding object information that can represent coordinate mapping relationship between the first image capturing apparatus and the second image capturing apparatus. Then for an object in an image captured by either of the image capturing apparatuses, coordinates of the object in the other image capturing apparatus can be obtained by the coordinate mapping model according to the N groups of corresponding object information. Thereby, movement of the object in multiple non-linear distortion lenses can be successfully tracked.

Figure 2A:
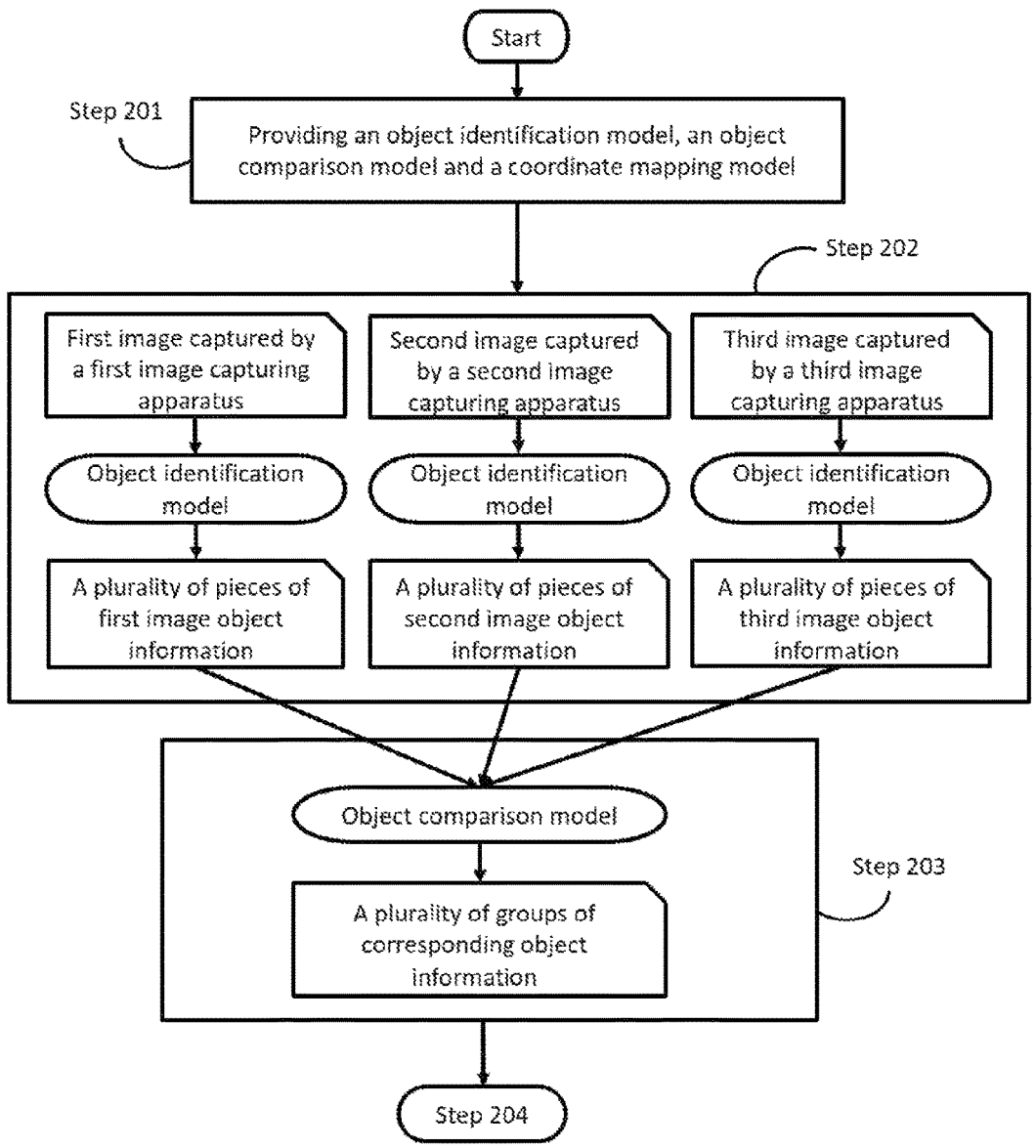
FIGS. 2A-2C are flowchart diagrams of an object tracking method in multiple non-linear distortion lenses according to a second embodiment of the present invention.
Figure 2B:
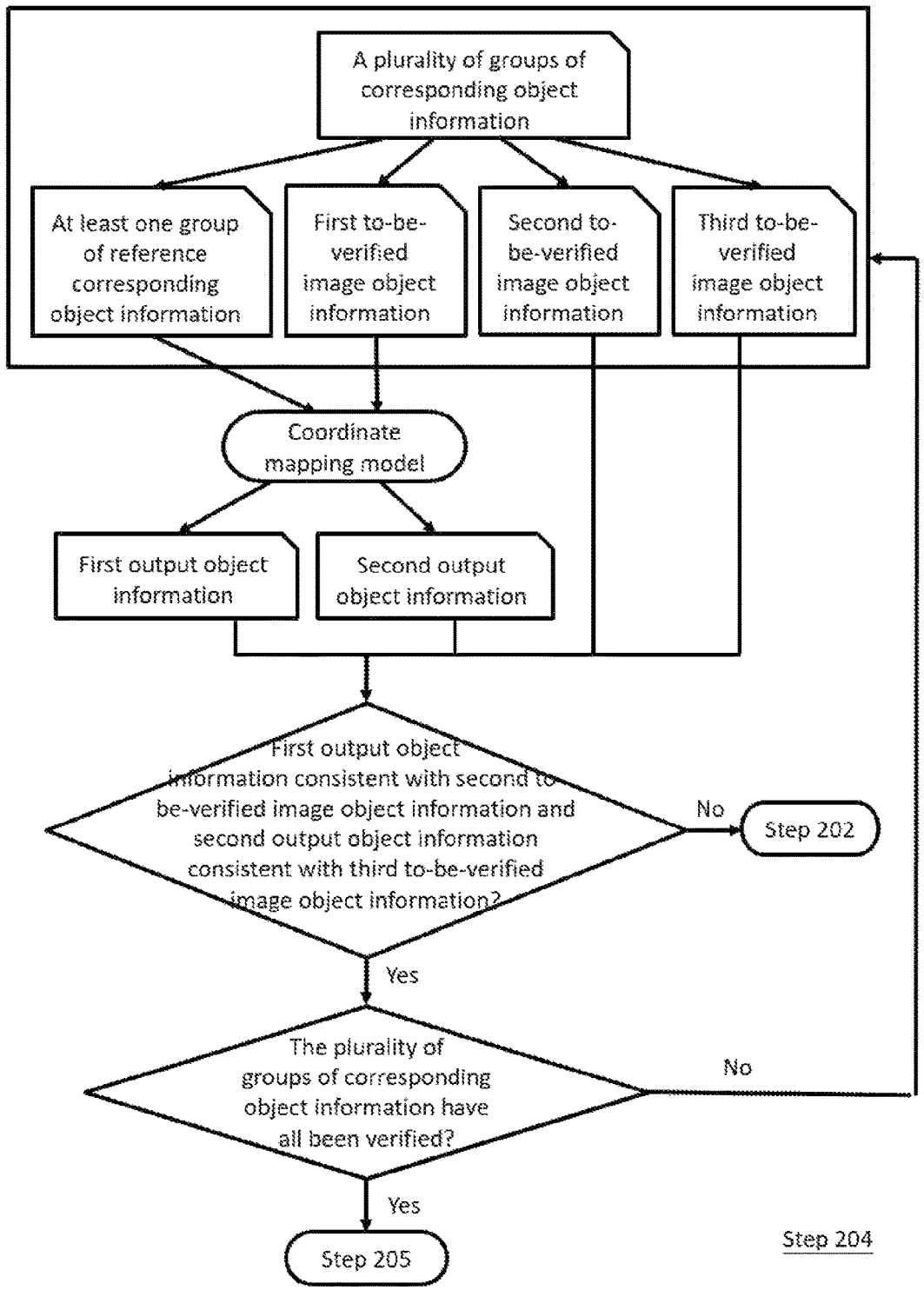
Figure 2C:
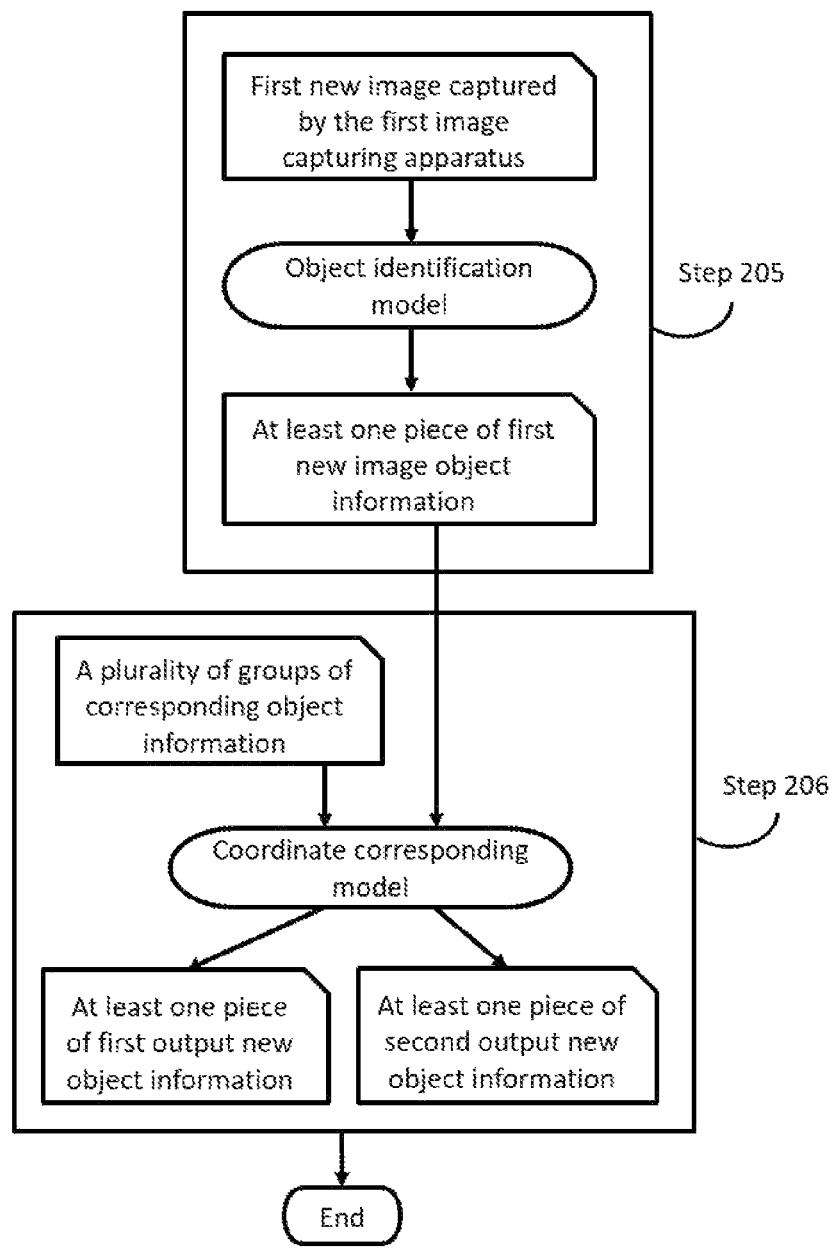

A second embodiment of the present invention is also an object tracking method in multiple non-linear distortion lenses, flowchart diagrams of which are depicted in FIGS. 2A-2C. The object tracking method may be executed by a computer or some other device having an electronic computation capability. The object tracking method of the second embodiment is similar to that of the first embodiment, so only differences therebetween will be detailed hereinbelow.

First, step 201 is executed to provide an object identification model, an object comparison model and a coordinate mapping model. Then, step 202 is executed. The step 202 is similar to the step 102 but further inputs a third image captured by a third image capturing apparatus into the object identification model to identify a plurality of pieces of third image object information in the third image. Similarly, the third image capturing apparatus comprises a non-linear distortion lens, e.g., a fisheye lens, a wide-angle lens or an endoscope. Next, step 203 is executed. The step 203 is similar to the step 103 but further inputs the plurality of pieces of third image object information into the object comparison model to find the plurality of groups of corresponding object information through comparison.

Also in the example of the first embodiment, a plurality of pieces of first image object information of the first image captured by the image capturing apparatus A in the office are [desk, $(2,2)_A$, $(3,3)_A$], [chair, $(1,4)_A$, $(1.5,4.5)_A$], [bookcase, $(4,2)_A$, $(5,4)_A$] and [wall, $(1,5)_A$, $(3,6)_A$], a plurality of pieces of second image object information of the second image captured by the image capturing apparatus B are [chair, $(-4,4)_B$, $(-3.5,4.5)_B$], [bookcase, $(-1,2)_B$, $(0,4)_B$], [wall, $(-4,5)_B$, $(-2,6)_B$] and [pot culture, $(0,5)_B$, $(0.5,5.5)_B$], and a plurality of pieces of third image object information of the third image captured by the image capturing apparatus C are [bookcase, $(-1,-3)_C$, $(0,-1)_C$], [wall, $(-4,0)_C$, $(2,1)_C$] and [pot culture, $(0,0)_C$, $(0.5,0.5)_C$]. In the step 203, the object comparison model may find through comparison that what appearing in all of the first image, the second image and the third image are the bookcase and the wall according to the plurality of pieces of first image object information, the plurality of pieces of second image object information and the plurality of pieces of third image object information, and obtain two groups of corresponding object information, i.e., [bookcase, $(4,2)_A$, $(5,4)_A$, $(-1,2)_B$, $(0,4)_B$, $(-1,-3)_C$, $(0,-1)_C$] and [wall, $(1,5)_A$, $(3,6)_A$, $(-4,5)_B$, $(-2,6)_B$, $(-4,0)_C$, $(-2,1)_C$].

Then, step 204 which is similar to the step 104 is executed. The step 204 divides the plurality of groups of corresponding object information into at least one group of reference corresponding object information and a group of to-be-verified corresponding object information. However, the group of to-be-verified corresponding object information in this embodiment further comprises a piece of third to-be-verified image object information in addition to the first to-be-verified image object information and the second to-be-verified image object information. In the step 204, a piece of second output object information is further obtained after the at least one group of reference corresponding object information and the first to-be-verified image object information are input into the coordinate mapping model. Next, the step 204 further determines through comparison whether the second output object information is consistent with the third to-be-verified image object information in addition to determining through comparison whether the first output object information is consistent with the second to-be-verified image object information. If the result of either of the comparisons is "inconsistent", the process returns back to the step 202. Otherwise, if the results of both the comparisons are "consistent", it means that verification of this group of to-be-verified corresponding object information has been completed, and the step 204 is repeated to verify a next group of corresponding object information. If the comparison result of each of the plurality of groups of corresponding object information is "consistent", then it means that the plurality of corresponding object information have all been completed, and then the process proceeds to step 205.

Also in the aforesaid example, it is assumed that N groups of corresponding object information are obtained in the aforesaid step 203, where N is a positive integer. Additionally, it is assumed that the first two groups represent corresponding object information of bookcase and wall, e.g., [bookcase, $(4,2)_A$, $(5,4)_A$, $(-1,2)_B$, $(0,4)_B$, $(-1,-3)_C$, $(0,-1)_C$] and [wall, $(1,5)_A$, $(3,6)_A$, $(-4,5)_B$, $(-2,6)_B$, $(-4,0)_C$, $(-2,1)_C$]. The step 204 divides the N groups of corresponding object information into N−1 groups of reference corresponding object information and one group of to-be-verified corresponding object information. It is hereby assumed that the corresponding object information of bookcase (i.e., [bookcase, $(4,2)_A$, $(5,4)_A$, $(-1,2)_B$, $(0,4)_B$, $(-1,-3)_C$, $(0,-1)_C$]) is selected in the step 204 as the to-be-verified corresponding object information, which comprises first to-be-verified image object information (e.g., [bookcase, $(4,2)_A$, $(5,4)_A$]), second to-be-verified image object information (e.g., [bookcase, $(-1,2)_B$, $(0,4)_B$]) and third to-be-verified image object information (e.g., [bookcase, $(-1,-3)_C$, $(0,-1)_C$], and the other N−1 groups serve as the reference corresponding object information. The step 204 inputs the N−1 groups of reference corresponding object information and the first to-be-verified image object information (e.g., [bookcase, $(4,2)_A$, $(5,4)_A$]) into the coordinate mapping model to obtain a piece of first output object information (e.g., [bookcase, $(x_1,y_1)_B$, $(x_2,y_2)_B$]) and a piece of second output object information (e.g., [bookcase, $(x_3,y_3)_C$, $(x_4,y_4)_C$]). Then the step 204 further determines through comparison whether the second output object information (e.g., [bookcase, $(x_3,y_3)_C$, $(x_4,y_4)_C$]) is consistent with the third to-be-verified image object information (e.g., [bookcase, $(-1,-3)_C$, $(0,-1)_C$]) in addition to determining through comparison whether the first output object information (e.g., [bookcase, $(x_1,y_1)_B$, $(x_2,y_2)_B$]) is consistent with the second to-be-verified image object information (e.g., [bookcase, $(-1,2)_B$, $(0,4)_B$]). If the result of either of the comparisons is "inconsistent", the process returns back to the step 202. Otherwise, if the results of both the comparisons is "consistent", it means that verification of this group of to-be-verified corresponding object information that corresponds to bookcase (i.e., [bookcase, $(4,2)_A$, $(5,4)_A$, $(-1,2)_B$, $(0,4)_B$, $(-1,-3)_C$, $(0,-1)_C$]) has been completed, and the step 204 is repeated to verify a next group of corresponding object information (e.g., the corresponding object information of wall). The step 204 may be repeated until the comparison result of each of the plurality of groups of corresponding object information is "consistent". Then it means that the N groups of corresponding object information have all been completed (i.e., the N groups of corresponding object information can represent the coordinate mapping relationship between the first image capturing apparatus, the second image capturing apparatus and the third image capturing apparatus), and then the process proceeds to the step 205.

The step 205 is the same as the step 105, so it will not be detailed herein. Next, step 206 is executed. The step 206 is similar to the step 106. However, after the plurality of groups of corresponding object information and the at least one piece of first new image object information are inputted into the coordinate mapping model in the step 206, at least one piece of second output new object information in the third image capturing apparatus that corresponds to the at least one piece of first new image object information is further obtained in addition to the at least one piece of first output new object information in the second image capturing apparatus that corresponds to the at least one piece of first new image object information.

Also in the aforesaid example, the new image that is newly captured by the image capturing apparatus A in the office is inputted into the object identification model to identify at least one piece of first image object information. It is assumed that three pieces of first new image object information are identified, which are [desk, $(2,2)_A$, $(3,3)_A$], [bookcase, $(4,2)_A$, $(5,4)_A$] and [window, $(1,1)_A$, $(1.5,1.5)_A$] respectively. The step 206 inputs the aforesaid N groups of corresponding object information and the three pieces of first new image object information (i.e., [desk, $(2,2)_A$, $(3,3)_A$], [bookcase, $(4,2)_A$, $(5,4)_A$] and [window, $(1,1)_A$, $(1.5,1.5)_A$]) into the coordinate mapping model to obtain three pieces of first output new object information (e.g., [desk, $(-3,2)_B$, $(-2,3)_B$], [bookcase, $(-1,2)_B$, $(0,4)_B$] and [window, $(-4,1)_B$, $(-3.5,1.5)_B$]) as well as three pieces of second output new object information (e.g., [desk, $(-3,3)_C$, $(-2,2)_C$], [bookcase, $(-1,-3)_C$, $(0,-1)_C$] and [window, $(-4,-4)_C$, $(-3.5,-3.5)_C$]). These rectangular coordinates just represent coordinates of the aforesaid objects in the vision of the image capturing apparatus B or the image capturing apparatus C and are also object information of desk, bookcase and window in the image capturing apparatus B or the image capturing apparatus C relative to the image capturing apparatus A.

As can be known from the above description of the second embodiment, the present invention uses the object identification model, the object comparison model and the coordinate mapping model that have been trained to find N groups of corresponding object information that can represent coordinate mapping relationship between the first image capturing apparatus, the second image capturing apparatus and the third image capturing apparatus. Then for an object in an image captured by any of the image capturing apparatuses, coordinates of the object in another of the image capturing apparatuses can be obtained by the coordinate mapping model according to the N groups of corresponding object information. Thereby, movement of the object in multiple non-linear distortion lenses can be successfully tracked.

Figure 3:
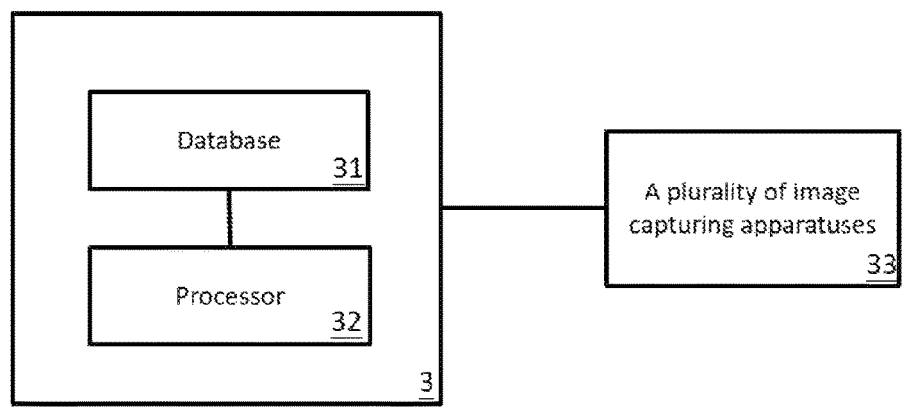
FIG. 3 is a block diagram of an object tracking system in multiple non-linear distortion lenses according to a third embodiment of the present invention.

A third embodiment of the present invention is an object tracking system 3 in multiple non-linear distortion lenses, a block diagram of which is depicted in FIG. 3. The object tracking system 3 may be electrically connected to a plurality of image capturing apparatuses 33, and comprises a database 31 and a processor 32 electrically connected to the database 31. The database 31 may be a memory, a Universal Serial Bus (USB), a hard disc, a Compact Disc (CD), a mobile disc or any other storage medium or circuit that is known to those of ordinary skill in the art and has the same functionality. The processor 32 may be any of various processors, central processing units (CPUs), microprocessors, control elements, other hardware elements capable of executing instructions or any other computing devices that is known to those of ordinary skill in the art. Each of the image capturing apparatuses 33 may comprise a non-linear distortion lens, e.g., a fisheye lens, a wide-angle lens and an endoscope.

The database 31 stores an object identification model, an object comparison model and a coordinate mapping model, and the processor 32 executes the following steps (a) to (f).

Step (a): reading the database 31 to obtain the object identification model, the object comparison model and the coordinate mapping model, wherein the object identification model, the object comparison model and the coordinate mapping model are trained by a deep learning method, and the deep learning method may comprise an artificial neural network method.

Step (b): inputting a first image captured by a first image capturing apparatus and a second image captured by a second image capturing apparatus into the object identification model to identify a plurality of pieces of first image object information in the first image and a plurality of pieces of second image object information in the second image respectively, where the plurality of pieces of first image object information at least comprise a plurality of object names of a plurality of objects in the first image and a plurality of coordinates of the plurality of objects in the first image capturing apparatus, and the plurality of pieces of second image object information at least comprise a plurality of object names of a plurality of objects in the second image and a plurality of coordinates of the plurality of objects in the second image capturing apparatus.

Step (c): inputting the plurality of pieces of first image object information and the plurality of pieces of second image object information into the object comparison model to find a plurality of groups of corresponding object information through comparison, where the plurality of groups of corresponding object information at least comprise a plurality of object names of a plurality of corresponding objects in the first image and the second image and a plurality of corresponding coordinates of the plurality of corresponding objects in the first image capturing apparatus and the second image capturing apparatus respectively.

Step (d): dividing the plurality of groups of corresponding object information into at least one group of reference corresponding object information and a group of to-be-verified corresponding object information, where the group of to-be-verified corresponding object information comprises a piece of first to-be-verified image object information and a piece of second to-be-verified image object information, inputting the at least one group of reference corresponding object information and the first to-be-verified image object information into the coordinate mapping model to obtain a piece of first output object information, and determining whether the first output object information is consistent with the second to-be-verified image object information. If the first output object information is inconsistent with the second to-be-verified image object information, and the process returns back to the step (b); and otherwise, if the first output object information is consistent with the second to-be-verified image object information, it means that verification of this group of to-be-verified corresponding object information has been completed, and the step (d) is repeated to verify the next group of corresponding object information. If all the comparison results of the plurality of groups of corresponding object information are "consistent", it means that the plurality of groups of corresponding object information have all been verified, and the process proceeds to the step (e).

Step (e): inputting a first new image captured by the first image capturing apparatus into the object identification model to identify at least one piece of first new image object information in the first new image.

Step (f): inputting the plurality of groups of corresponding object information and the at least one piece of first new image object information into the coordinate mapping model to obtain at least one piece of first output new object information in the second image capturing apparatus that corresponds to the at least one piece of first new image object information.

In addition to the aforesaid steps, the third embodiment can also execute all the operations and steps set forth in the first embodiment, have the same functions and deliver the same technical effects as the first embodiment. How the third embodiment executes these operations and steps, has the same functions and delivers the same technical effects as the first embodiment will be readily appreciated by those of ordinary skill in the art based on the explanation of the first embodiment, and thus will not be further described herein.

Please still refer to FIG. 3, which is also a block diagram of an object tracking system according to a fourth embodiment of the present invention. This embodiment is similar to the third embodiment, so elements represented by the same reference numerals also have the same functions and, thus, will not be described again herein. As compared with the third embodiment, the processor 32 in the fourth embodiment of the present invention further inputs a third image captured by a third image capturing apparatus into the object identification model to identify a plurality of pieces of third image object information in the third image when executing the step (b), and further inputs the plurality of pieces of third image object information into the object comparison model to find the plurality of groups of corresponding object information through comparison when executing the step (c).

Additionally, as compared with the third embodiment, the processor 32 in the fourth embodiment of the present invention divides the plurality of groups of corresponding object information into at least one group of reference corresponding object information and one group of to-be-verified corresponding object information when executing the step (d), where the group of to-be-verified corresponding object information further comprises a piece of third to-be-verified image object information in addition to the first to-be-verified image object information and the second to-be-verified image object information. Additionally, in addition to the first output object information, a piece of second output object information is further obtained by the processor 32 after the at least one group of reference corresponding object information and the first to-be-verified image object information are input into the coordinate mapping model. Next, the processor 32 further determines whether the second output object information is consistent with the third to-be-verified image object information in addition to determining whether the first output object information is consistent with the second to-be-verified image object information. If the result of either of the comparisons is "inconsistent", the process returns back to the step (b). Otherwise, if the results of both the comparisons are "consistent", it means that verification of this group of to-be-verified corresponding object information has been completed, and the step (d) is repeated to verify a next group of corresponding object information. If the comparison result of each of the plurality of groups of corresponding object information is "consistent", then it means that the plurality of groups of corresponding object information have all been completed, and then the process proceeds to step (e).

Additionally, as compared with the third embodiment, at least one piece of second output new object information in the third image capturing apparatus that corresponds to the at least one piece of first new image object information in addition to the at least one piece of first output new object information in the second image capturing apparatus that corresponds to the at least one piece of first new image object information is further obtained by the processor 32 in the fourth embodiment of the present invention after the plurality of groups of corresponding object information and the at least one piece of first new image object information are input into the coordinate mapping model in step (f).

In addition to the aforesaid steps, the fourth embodiment can also execute all the operations and steps set forth in the second embodiment, have the same functions and deliver the same technical effects as the second embodiment. How the fourth embodiment executes these operations and steps, has the same functions and delivers the same technical effects as the second embodiment will be readily appreciated by those of ordinary skill in the art based on the explanation of the second embodiment, and thus will not be further described herein.

As can be known from the above descriptions, the present invention trains three deep learning networks (the object identification model, the object comparison model and the coordinate mapping model as described above), and then uses the object identification model, the object comparison model and the coordinate mapping model that have been trained to tract an object. Briefly speaking, the present invention uses the object identification model to identify objects in non-linear distortion lenses, uses the object comparison model to find objects that correspond to each other in images captured by different image capturing apparatuses, and then uses the coordinate mapping model to find N groups of corresponding object information that can represent coordinate mapping relationships between the image capturing apparatuses, i.e., to find coordinate mapping (i.e., corresponding positions) of a same object (feature object) in visions of different image capturing apparatuses. Then for an object in an image captured by any of the image capturing apparatus, coordinates of the object in another of the image capturing apparatuses can be obtained by the coordinate mapping model according to the N groups of corresponding object information. Thereby, movement of the object in multiple non-linear distortion lenses can be successfully tracked. The aforesaid models trained by the deep learning method in the present invention are applicable to images captured by various non-linear distortion lenses, and is not limited to specific non-linear distortion degree or to specific model.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An object tracking method, comprising:
   (a) providing an object identification model, an object comparison model and a coordinate mapping model;
   (b) inputting a first image captured by a first image capturing apparatus and a second image captured by a second image capturing apparatus into the object identification model to identify a plurality of pieces of first image object information in the first image and a plurality of pieces of second image object information in the second image respectively;
   (c) inputting the plurality of pieces of first image object information and the plurality of pieces of second image object information into the object comparison model to find a plurality of groups of corresponding object information through comparison;
   (d) dividing the plurality of groups of corresponding object information into at least one group of reference corresponding object information and a group of to-be-verified corresponding object information, wherein the group of to-be-verified corresponding object information comprises a piece of first to-be-verified image object information and a piece of second to-be-verified image object information, inputting the at least one group of reference corresponding object information and the first to-be-verified image object information into the coordinate mapping model to obtain a piece of first output object information, determining that the first output object information is consistent with the second to-be-verified image object information, and repeating the step (d) until all the plurality of groups of corresponding object information have been verified;
   (e) inputting a first new image captured by the first image capturing apparatus into the object identification model to identify at least one piece of first new image object information in the first new image; and
   (f) inputting the plurality of groups of corresponding object information and the at least one piece of first new image object information into the coordinate mapping model to obtain at least one piece of first output new object information in the second image capturing apparatus that corresponds to the at least one piece of first new image object information.

2. The object tracking method of claim 1, wherein the step (b) further inputs a third image captured by a third image capturing apparatus into the object identification model to identify a plurality of pieces of third image object information in the third image.

3. The object tracking method of claim 2, wherein the step (c) further inputs the plurality of pieces of third image object information into the object comparison model to find the plurality of groups of corresponding object information through comparison.

4. The object tracking method of claim 3, wherein the group of to-be-verified corresponding object information further comprises a piece of third to-be-verified image object information, and a piece of second output object information is further obtained after the at least one group of reference corresponding object information and the first to-be-verified image object information are input into the coordinate mapping model in the step (d).

5. The object tracking method of claim 4, wherein at least one piece of second output new object information in the third image capturing apparatus that corresponds to the at least one piece of first new image object information is further obtained after the plurality of groups of corresponding object information and the at least one piece of first new image object information are input into the coordinate mapping model in the step (f).

6. The object tracking method of claim 1, wherein the plurality of pieces of first image object information at least comprises a plurality of object names of a plurality of objects in the first image and a plurality of coordinates of the plurality of objects in the first image capturing apparatus, and the plurality of pieces of second image object information at least comprises a plurality of object names of a plurality of objects in the second image and a plurality of coordinates of the plurality of objects in the second image capturing apparatus.

7. The object tracking method of claim 1, wherein the plurality of groups of corresponding object information at least comprises a plurality of object names of a plurality of corresponding objects existing in both the first image and the second image and a plurality of corresponding coordinates of the plurality of corresponding objects in the first image capturing apparatus and the second image capturing apparatus respectively.

8. The object tracking method of claim 2, wherein the first image capturing apparatus, the second image capturing apparatus and the third image capturing apparatus each comprise a non-linear distortion lens.

9. The object tracking method of claim 8, wherein each of the non-linear distortion lenses is one of a fisheye lens, a wide-angle lens and an endoscope.

10. The object tracking method of claim 1, wherein the object identification model, the object comparison model and the coordinate mapping model are each trained by a deep learning method.

11. An object tracking system, comprising:
    a database, storing an object identification model, an object comparison model and a coordinate mapping model; and
    a processor electrically connected to the database, being configured to execute the following steps:
    (a) reading the database to obtain the object identification model, the object comparison model and the coordinate mapping model; and
    (b) inputting a first image captured by a first image capturing apparatus and a second image captured by a second image capturing apparatus into the object identification model to identify a plurality of pieces of first image object information in the first image and a plurality of pieces of second image object information in the second image respectively;
    (c) inputting the plurality of pieces of first image object information and the plurality of pieces of second image object information into the object comparison model to find a plurality of groups of corresponding object information through comparison;
    (d) dividing the plurality of groups of corresponding object information into at least one group of reference corresponding object information and a group of to-be-verified corresponding object information, wherein the group of to-be-verified corresponding object information comprises a piece of first to-be-verified image object information and a piece of second to-be-verified image object information, inputting the at least one group of reference corresponding object information and the first to-be-verified image object information into the coordinate mapping model to obtain a piece of first output object information, determining that the first output object information is consistent with the second to-be-verified image object information, and repeating the step (d) until all the plurality of groups of corresponding object information have been verified;
(e) inputting a first new image captured by the first image capturing apparatus into the object identification model to identify at least one piece of first new image object information in the first new image; and
(f) inputting the plurality of groups of corresponding object information and the at least one piece of first new image object information into the coordinate mapping model to obtain at least one piece of first output new object information in the second image capturing apparatus that corresponds to the at least one piece of first new image object information.

12. The object tracking system of claim 11, wherein the processor further inputs a third image captured by a third image capturing apparatus into the object identification model to identify a plurality of pieces of third image object information in the third image.

13. The object tracking system of claim 12, wherein the processor further inputs the plurality of pieces of third image object information into the object comparison model to find the plurality of groups of corresponding object information through comparison.

14. The object tracking system of claim 13, wherein the group of to-be-verified corresponding object information further comprises a piece of third to-be-verified image object information, and a piece of second output object information is further obtained by the processor after the at least one group of reference corresponding object information and the first to-be-verified image object information are input into the coordinate mapping model.

15. The object tracking system of claim 14, wherein at least one piece of second output new object information in the third image capturing apparatus that corresponds to the at least one piece of first new image object information is further obtained by the processor after the plurality of groups of corresponding object information and the at least one piece of first new image object information are input into the coordinate mapping model.

16. The object tracking system of claim 11, wherein the plurality of pieces of first image object information at least comprises a plurality of object names of a plurality of objects in the first image and a plurality of coordinates of the plurality of objects in the first image capturing apparatus, and the plurality of pieces of second image object information at least comprises a plurality of object names of a plurality of objects in the second image and a plurality of coordinates of the plurality of objects in the second image capturing apparatus.

17. The object tracking system of claim 11, wherein the plurality of groups of corresponding object information at least comprises a plurality of object names of a plurality of corresponding objects existing in both the first image and the second image and a plurality of corresponding coordinates of the plurality of corresponding objects in the first image capturing apparatus and the second image capturing apparatus respectively.

18. The object tracking system of claim 12, wherein the first image capturing apparatus, the second image capturing apparatus and the third image capturing apparatus each comprise a non-linear distortion lens.

19. The object tracking system of claim 18, wherein each of the non-linear distortion lenses is one of a fisheye lens, a wide-angle lens and an endoscope.

20. The object tracking system of claim 11, wherein the object identification model, the object comparison model and the coordinate mapping model are each trained by a deep learning method.

* * * * *